United States Patent [19]

Claussen et al.

[11] Patent Number: 5,071,524

[45] Date of Patent: * Dec. 10, 1991

[54] PROCESS FOR THE PREPARATION OF ELECTRICALLY CONDUCTIVE POLYHETEROAROMATICS

[75] Inventors: Uwe Claussen, Leverkusen; Udo Herrmann, Dormagen, both of Fed. Rep. of Germany

[73] Assignee: Bayer Aktiengesellschaft, Leverkusen, Fed. Rep. of Germany

[*] Notice: The portion of the term of this patent subsequent to Jan. 15, 2008 has been disclaimed.

[21] Appl. No.: 581,487

[22] Filed: Sep. 12, 1990

[30] Foreign Application Priority Data

Sep. 28, 1989 [DE] Fed. Rep. of Germany ........ 3932326

[51] Int. Cl.$^5$ ................................................ C25B 3/02
[52] U.S. Cl. ..................................... 204/78; 204/59 R
[58] Field of Search ............................. 204/59 R, 78

[56] References Cited

U.S. PATENT DOCUMENTS

| | | | |
|---|---|---|---|
| 4,536,262 | 8/1985 | Wegner et al. | 204/78 |
| 4,547,270 | 10/1985 | Naarmann | 204/59 R |
| 4,569,734 | 2/1986 | Naarmann et al. | 204/78 |
| 4,749,451 | 6/1988 | Naarmann | 204/59 R |
| 4,985,124 | 1/1991 | Claussen et al. | 204/72 |

FOREIGN PATENT DOCUMENTS 3338906 2/1989 Fed. Rep. of Germany.

*Primary Examiner*—John Niebling
*Assistant Examiner*—Steven P. Marquis
*Attorney, Agent, or Firm*—Sprung Horn Kramer & Woods

[57] ABSTRACT

The invention relates to a new process for the preparation of electrically conductive polyheteroaromatics by electrochemical oxidation of oxidatively polymerizable monomeric heteroaromatic compounds; according to the invention, an electrolyte system which consists of monomeric compound, water, polyhydric alcohol and sulphonic acid and/or sulphuric acid half-ester and in which the electrical conductivity displays a minimum is used.

3 Claims, No Drawings

PROCESS FOR THE PREPARATION OF ELECTRICALLY CONDUCTIVE POLYHETEROAROMATICS

The invention relates to a new process for the preparation of electrically conductive polyheteroaromatics by electrochemical oxidation of oxidatively polymerizable monomeric heteroaromatic compounds and the polyheteroaromatics obtained by this process.

It is already known that oxidatively polymerizable monomeric heteroaromatic compounds, such as pyrrole, can be oxidized electrochemically to give electrically conductive polyheteroaromatics, for example to give polypyrrole (see, for example, J.C.S. Chem. Comm. 1979, pages 635 and 854 or German Offenlegungsschrift (German Published Specification) 3,049,551).

It is furthermore known that the quality, for example the nature of the surface, and the physical properties, in particular the conductivity but also the mechanical strength, of the polymers obtained by electrochemical oxidation depends greatly on the conditions used during the oxidation (see, for example, J. Electrochem. Soc. 134 (1) 101–105 (1987)). The most diverse conditions for electrochemical oxidation have therefore already been investigated and described.

The following systems have thus been proposed for the oxidation:

a) Solutions, containing conductivity salts, of the monomeric heteroaromatic compounds in organic solvents (see, for example, European Patent A-0,055,358 and the publications cited in this);

b) Solutions, containing conductivity salts, of the monomers in water-containing organic solvents (see, for example, U.S. patent specification No. 3,574,072);

c) Aqueous solutions, containing conductivity salts and surfactants, of the monomers (see J. Electrochem. Soc. loc. cit.; Macromol. Chem. Rapid Comm. 5, 157–164 (1984); Mol. Cryst. Liqu. Cryst. 1985, Vol. 118, 193–197; Jap. J. Appl. Phys. Part 2, (1985), 24 (6) 423–424 (reviewed in CA 103: 88 486s); and French Patent A-2,556,137); and d) Aqueous dispersions, containing conductivity salts and surfactants and if appropriate water-miscible organic solvents, of the monomers (see European Patent A-0,129,070); and e) Aqueous dispersions containing conductivity salts, surfactants, organic water-miscible solvents and aliphatic hydrocarbons (see Japanese Patent Application 87/93, 863 (reviewed in CA 107: 26 112r)).

Polyheteroaromatic films, in particular polypyrrole films, which are of a good quality and have good physical properties are admittedly obtainable with the aid of these known systems; the films are smooth, flexible and chemically stable and electrical conductivities of 1 to more than 400 S/cm are quoted for them. However, reworking of the processes has shown that electrical conductivities >30 S/cm are not reproducible (see Macromol. Chem. Rapid Commun. loc. cit. page 158), and in the end only polyheteroaromatic films of a conductivity $\leq 30$ S/cm are obtainable. The films furthermore all have a storage capacity/kg of film which is too low for use in practice.

Surprisingly, it has been found that by electrochemical oxidation of monomeric heteroaromatic compounds in systems containing water, surfactants and organic water-miscible solvents (co-surfactants), polyaromatic films having considerably improved properties—their electrical conductivity is reliably reproducible and is at least 100 S/cm and their storage capacity is about 30% higher than the storage capacities hitherto achieved—are obtained if the anodic oxidation is carried out in an electrolyte system which exhibits a conductivity minimum and contains water, sulphonic acids and/or sulphuric acid half-esters, polyhydric alcohols and the monomer.

The invention therefore relates to a process for the preparation of electrically conductive polyheteroaromatics by electrochemical oxidation of monomeric heteroaromatic compounds in electrolyte systems containing water, surfactants and/or co-surfactants, the polyheteroaromatics being deposited on the surface of the anode, which is characterized in that an electrolyte system which consists of monomeric compound, water, sulphonic acid and/or sulphuric acid half-ester and polyhydric alcohol and in which the electrical conductivity exhibits a minimum is used.

The electrolyte systems to be used according to the invention for the electrochemical oxidation are obtained by adding the monomer to be oxidized to the mixtures containing water, polyhydric alcohol, sulphonic acid and/or sulphuric acid half-ester, their electrical conductivity being determined at the same time, until the conductivity minimum of the mixture in question is reached. It has been found that the conductivity of the mixtures containing water, polyhydric alcohol and sulphonic acid and/or sulphuric acid half-ester pass through a conductivity minimum on addition of the monomers. Electrolyte systems which are in this conductivity minimum reproducibly produce polyheteroaromatic films having considerably improved mechanical and electrical properties by anodic oxidation.

Oxidatively polymerizable monomeric heteroaromatic compounds which can be used in the process according to the invention are above all heteroaromatic compounds having 5- or 6-membered ring systems. These monomeric heteroaromatic compounds preferably contain 1 to 3 hetero atoms, in particular N, O and/or S atoms, in the ring system and can be substituted on the ring carbon atoms, for example by alkyl groups, in particular having 1 to 6 C atoms, preferably at least two ring carbon atoms not being substituted, so that the anodic oxidation can be carried out simply and thoroughly. Examples of such heteroaromatic compounds are: furan, thiophene, thiazole, oxazole, thiadiazole, imidazole, pyridine, 3,5-dimethylpyridine, pyrazine and 3,5-dimethylpyrazine. Pyrroles, in particular unsubstituted pyrrole, but also pyrroles substituted by alkyl groups and halogen atoms, such as 3,4-dialkylpyrroles, for example 3,4-dimethylpyrrole and 3,4-diethylpyrrole, and the 3,4-dihalogenopyrroles, in particular 3,4-dichloropyrrole, are preferably employed in the process according to the invention.

Examples which may be mentioned of representatives of the sulphonic acids and sulphuric acid half-esters to be used in the electrolyte systems according to the invention are: alkanesulphonic acids, such as methane- and trifluoromethanesulphonic acid, and in particular $C_8$-$C_{18}$-alkanesulphonic acids, such as octanesulphonic acid, perfluorooctanesulphonic acid and dodecanesulphonic acid; and aryl- and alkylarylsulphonic acids, such as benzene-, toluene-, ethylbenzene-, dodecylbenzene- and naphthalenesulphonic acid. Sulphuric acid half-esters which may be mentioned above all are sulphuric acid octyl, decyl and dodecyl ester.

Representatives which may be mentioned of the polyhydric alcohols to be used in the electrolyte systems according to the invention are, preferably, diols, such as ethylene glycol, propylene 1,3-glycol, butane-1,4-diol, hexane-1,6-diol, diethylene glycol and triethylene glycol; and triols, such as glycerol and hexanetriol.

In general, sulphonic acids (sulphuric acid half-esters) and polyhydric alcohols are employed in a molar ratio such that 5 to 25 mol of polyhydric alcohol are present per mol of sulphonic acid (sulphuric acid half-ester).

The concentration of the mixtures of sulphonic acid (sulphuric acid half-ester) and polyhydric alcohol in the aqueous electrolyte systems to be used according to the invention can be 5 to 60% by weight, based on the total weight of the electrolyte system; the concentration is preferably 10 to 50% by weight.

The amounts of monomeric heteroaromatic compound which can be added to the aqueous mixture of sulphonic acid (sulphuric acid half-ester) and polyhydric alcohol until the conductivity minimum is reached are in general 1 to 15 % by weight, based on the total weight of the aqueous electrolyte system.

The process according to the invention can be carried out in the customary electrolytic cells or electrolysis apparatuses which are known per se. Simple electrolysis apparatuses consisting of a cell without a diaphragm, two electrodes and an external current source, for example, are particularly suitable. The electrodes in these apparatuses can be made of, for example, graphite or a customary inert electrode material, in particular noble metal, such as gold, platinum or palladium, high-grade steel, nickel or titanium. Since the monomeric heteroaromatic compounds are oxidized anodically during the electrochemical polymerization and the polymers formed are deposited on the anode, at least the anodes, but in particular both electrodes, are flat in construction for the production of films of the poly(heteroaromatics). The size of the anode surface in this procedure corresponds to the size of the resulting polymer film. The surfaces of the two electrodes are preferably arranged parallel to one another.

In addition to the above simple electrolytic cell without a diaphragm, it is also possible for other electrolysis equipment to be used for the process according to the invention, for example cells with diaphragms or those with reference electrodes for exact determination of the potential. It is often advantageous to measure the amount of current (A seconds) since inter alia the layer thickness of the films deposited can be checked via this.

The process according to the invention is usually carried out at room temperature. Since the reaction temperature has proved to be not critical for the polymerization of the heteroaromatic compounds, the temperature can, however, be varied within a wide range as long as the temperature does not fall below or rise above the solidification point or boiling point of the electrolyte solvent. In general, a polymerization temperature in the range from 0° to 50° C., in particular +10° to +30° C., has proved to be very advantageous.

Any direct current source, such as, for example, a battery, which delivers a sufficiently high electrical voltage is suitable as the current source for operating the electrolytic cell in which the process according to the invention is carried out. The electrochemical polymerization according to the invention is usually operated at a voltage in the range from 1 to 10 volt, preferably in the range from 1.5 to 4 volt. The level of the voltage chosen also depends here inter alia on the distance between the electrodes, and is higher the greater this distance. Values in the range from 0.05 to 50 mA/cm$^2$, preferably in the range from 1 to 15 mA/cm$^2$, have proved to be favourable and advantageous for the current density in the process according to the invention.

The duration of the electrolysis depends inter alia on the electrolyte system used, the particular electrolysis conditions and in particular also on the desired film thickness. The duration of the electrolysis is usually in the range from a few minutes to several hours. Thus, for example, films a few $\mu$m thick, for example 5 to 10 $\mu$m thick, can be obtained without problems within a quarter of an hour; films of a thickness in the range from 10 to 100 $\mu$m can also be prepared by slow electrolysis, for example over a period of 2 to 12 hours.

The film-shaped poly(heteroaromatics) deposited anodically during the electrolysis are washed with solvents, preferably water or aqueous solvents, to remove adhering conductive salt and/or emulsifier and dried at temperatures in the range from 25° to 150° C., preferably in vacuo. If graphite, noble metal, steel, titanium, nickel or similar electrodes are used, the films of the poly(heteroaromatics) can then in general easily be detached from the electrode, above all if layer thicknesses of more than 5 $\mu$m have been deposited. The films thus obtained are self-supporting and stable, have good mechanical properties and strengths and have a well-developed, coherent surface.

The polyheteroaromatic films obtainable according to the invention differ from the polymer films obtained according to the prior art in that the ratio of monomer units/anions in them is <3:1, and in that they contain no incorporated organic solvent. As a result of their higher content of positively charged N atoms, the polymer films obtainable according to the invention have a considerably higher charge density than the polymer films obtainable according to the prior art. In addition, the polymer films obtainable by the process according to the invention are distinguished by a smoother surface and a more uniform layer structure, and consequently by an improved electrical conductivity.

The poly(heteroaromatics) prepared according to the invention have very good technicological properties and can be employed in all fields in which the previous poly(heteroaromatics) are also used. These include, for example, the use for the production of capacitors, electrical switches, semiconductor components, electrodes and shielding materials and also for antistatic finishing of plastics.

EXAMPLE 1

A mixture of 50 g of water, 13.3 g of sodium dodecyl sulphate and 22.4 g of ethylene glycol is freed from the sodium ions by filtration over a strongly acid cation exchanger. The strongly acid aqueous mixture thus obtained is titrated conductometrically with distilled pyrrole until the electrolyte system exhibits a conductivity minimum (consumption of pyrrole up to the conductivity minimum: 4.1 g).

The electrolyte system thus obtained is oxidized at a current density of 13 mA/cm$^2$ on a polycarbonate electrode coated with gold by vapour deposition. The black polypyrrole film has a thickness of 6 $\mu$m and a good mechanical stability. Its surface is dense and shining. Its empirical composition (according to combustion analysis) is:

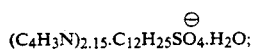
$(C_4H_3N)_{2.15} \cdot C_{12}H_{25}SO_4 \cdot H_2O$;

its conductivity (measured by the van der Pauw method) is 81 S/cm.

An electrolyte system prepared in the same manner from 80.7 g of water, 6.7 g of toluenesulphonic acid, 33 g of glycol and 1.8 g of pyrrole produces, under the electrolysis conditions described, a polypyrrole film having a specific conductivity of 56 S/cm and the empirical composition

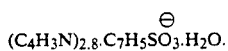
$(C_4H_3N)_{2.8} \cdot C_7H_5SO_3 \cdot H_2O.$

An electrolyte system prepared in the same manner from 400 g of water, 16.95 g of toluenesulphonic acid, 83.05 g of glycol and 6 g of pyrrole produces, on electrolysis at a current density of 3.2 mA/cm$^2$, a polypyrrole film having a specific conductivity of 90 S/cm and the empirical composition

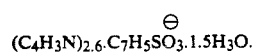
$(C_4H_3N)_{2.6} \cdot C_7H_5SO_3 \cdot 1.5H_2O.$

Equivalent polypyrrole films having smooth shining surfaces and a comparable conductivity were likewise obtained using the electrolyte systems described in the following table. The electrolyte systems were prepared in the manner described above by conductometric titration of the aqueous acid/alcohol mixtures with distilled pyrrole.

TABLE

| S<br>Sulphonic acid<br>or sulphuric acid<br>half-ester | A<br>Polyhydric<br>alcohol | Molar ratio<br>of acid/A | S/A mixture<br>[% by weight]* | Water<br>[% by weight]* | Pyrrole<br>[% by weight]* |
| --- | --- | --- | --- | --- | --- |
| p-Toluenesulphonic acid | Ethylene glycol | 1:15 | 49.4 | 49.4 | 1.2 |
| p-Toluenesulphonic acid | " | 1:15 | 14.9 | 82 | 3.1 |
| p-Toluenesulphonic acid | Propane-1,3-diol | 1:10 | 48.5 | 50 | 1.5 |
| p-Toluenesulphonic acid | " | 1:10 | 14 | 81.4 | 4.6 |
| p-Toluenesulphonic acid | " | 1:25 | 48.5 | 50 | 1.5 |
| p-Toluenesulphonic acid | " | 1:25 | 14 | 82.5 | 3.5 |
| p-Toluenesulphonic acid | Butane-1,4-diol | 1:10 | 37 | 60 | 3 |
| p-Toluenesulphonic acid | " | 1:10 | 14 | 80.4 | 5.6 |
| Dodecylbenzene-sulphonic acid | Ethylene glycol | 1:15 | 43 | 56 | 1 |
| Dodecylbenzene-sulphonic acid | " | 1:15 | 15 | 81 | 4 |

*% by weight, based on the total weight of the electrolyte system

What is claimed is:

1. In the process for the preparation of an electrically conductive polyheteroaromatic which comprises electrochemically oxidizing a monomeric heteroaromatic compound in an electrolyte system which comprises the monomeric heteroaromatic compound, water, a surfactant, a co-surfactant or a surfactant and a co-surfactant and depositing the polyheteroaromatic compound on the surface of the anode, the improvement which comprises using as the electrolyte system a system which consists essentially of the monomeric compound, water, a polyhydric alcohol and a sulphonic acid, a sulphuric acid half-ester or a sulphonic acid and a sulphuric acid half-ester and the electrical conductivity of which exhibits a minimum.

2. The process of claim 1, wherein the concentration of the mixture of sulphonic acid and polyhydric alcohol, of sulphuric acid half-ester and polyhydric alcohol or sulphonic acid and sulphuric half-ester and polyhydric alcohol is 5 to 60% by weight, based on the total weight of the electrolyte system, and the concentration of the pyrrole is 1 to 15% by weight, based on the total weight of the electrolyte system.

3. The process of claim 1 wherein a diol or a triol is used as the polyhydric alcohol.

* * * * *